Aug. 26, 1924.
E. C. OAKES
MILKING MACHINE PULSATOR
Filed April 1, 1922    2 Sheets-Sheet 1
1,506,321
FIG. I.
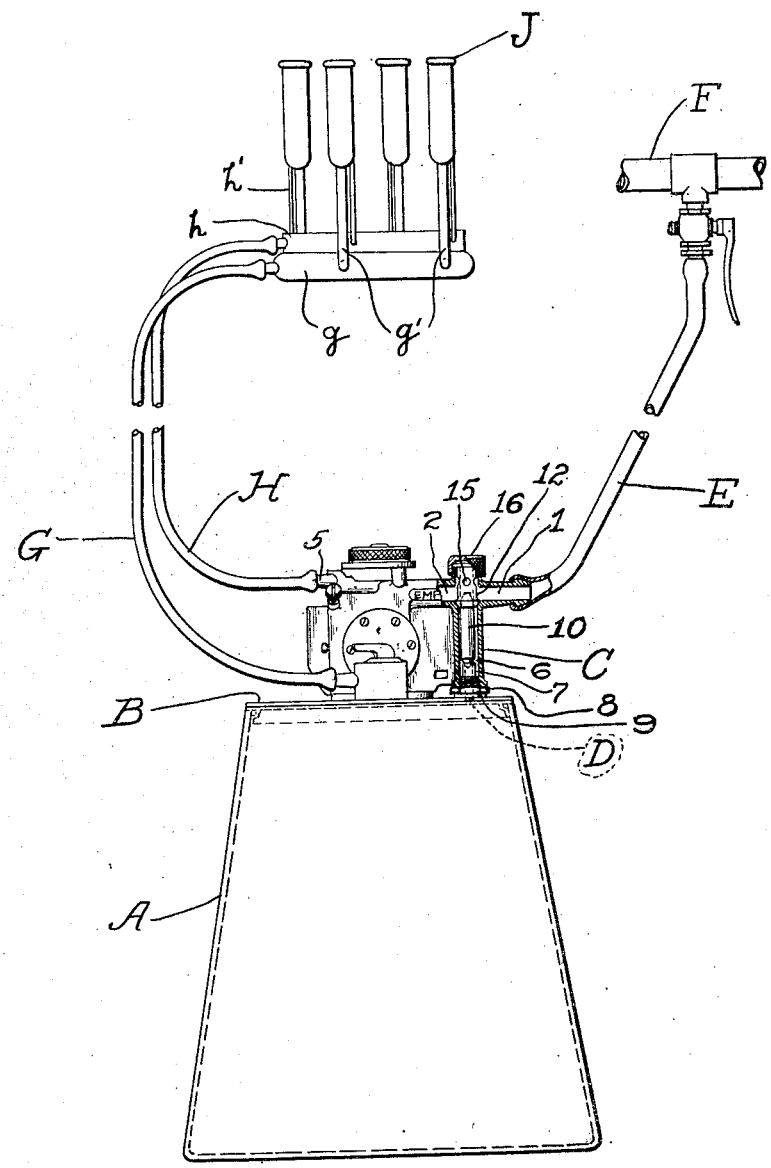
Inventor
ERNEST C. OAKES
By his Attorney Aug. 26, 1924.
E. C. OAKES
1,506,321
MILKING MACHINE PULSATOR
Filed April 1, 1922   2 Sheets-Sheet 2
Fig. II.
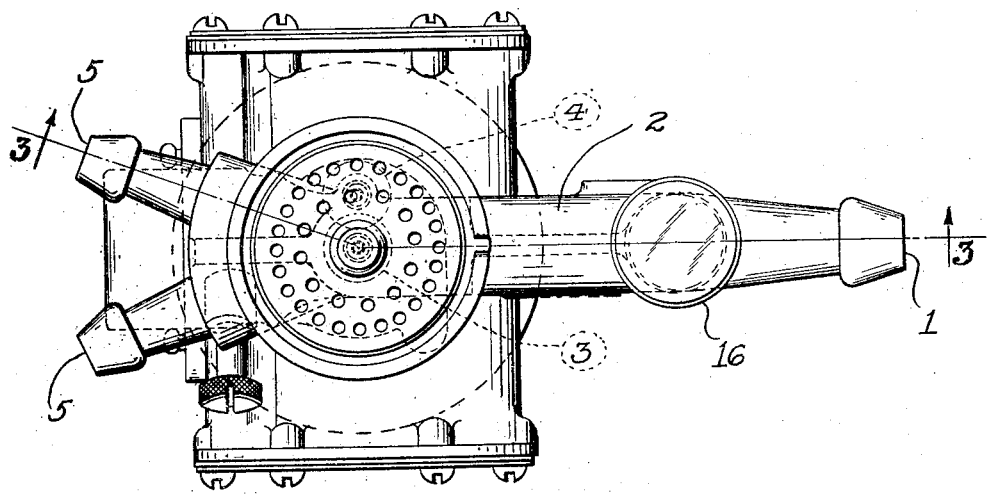
Fig. III.
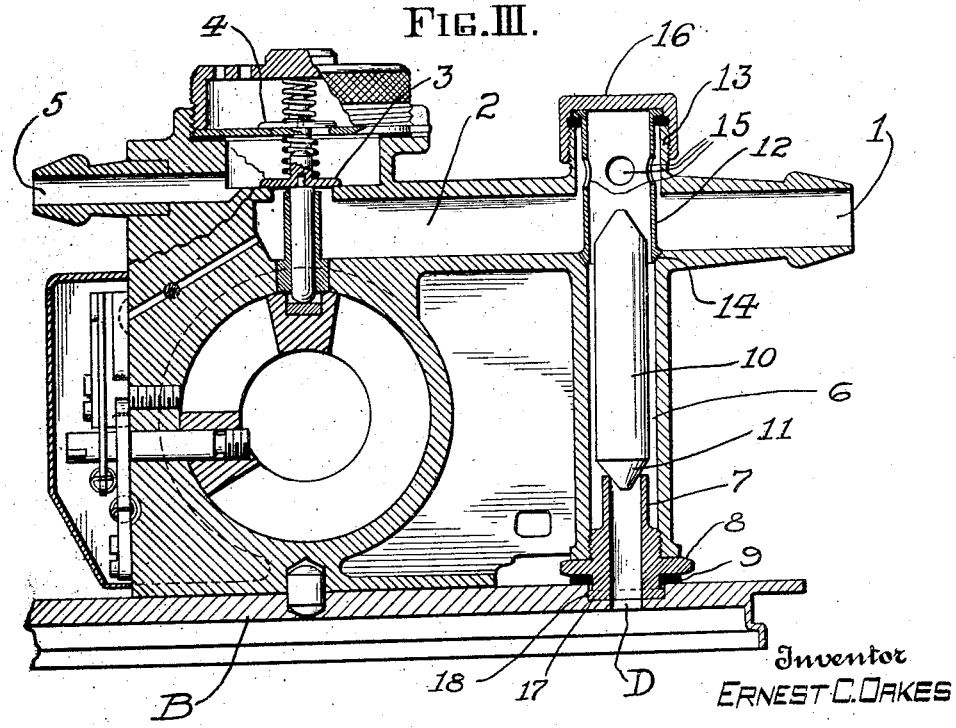
Inventor
ERNEST C. OAKES
By his Attorney Patented Aug. 26, 1924.

1,506,321

UNITED STATES PATENT OFFICE.

ERNEST C. OAKES, OF BLOOMFIELD, NEW JERSEY, ASSIGNOR, BY MESNE ASSIGNMENTS, TO EMPIRE MILKING MACHINE COMPANY, OF BLOOMFIELD, NEW JERSEY, A CORPORATION OF NEW JERSEY.

MILKING-MACHINE PULSATOR.

Application filed April 1, 1922. Serial No. 548,688.

*To all whom it may concern:*

Be it known that I, ERNEST C. OAKES, a citizen of the United States, residing in the city of Bloomfield, county of Essex, State of New Jersey, have invented certain new and useful Improvements in Milking-Machine Pulsators, of which the following is a specification, reference being had to the accompanying drawings, illustrative of one particular embodiment of my invention.

This invention relates to the pulsating and control mechanism for milking machines, and the simplified and consolidated unit embodying the pulsator mechanism, ports, connections, valves and all the cooperating detailed parts. In particular, this application has reference to the valve mechanism inter-related with the ports for vacuum connections to the teat-cups and the vacuum connections to the milk pail when the unit is associated with the milk pail or can.

A particular embodiment of this invention is shown in the accompanying drawings forming a part hereof, in which:

Fig. I is an elevation of a milk pail with unit pulsator mechanism on its lid, and the connections to teat-cups and to the piping providing the source of vacuum.

Fig. II is a plan view of the pulsator unit, on enlarged scale compared with Fig. I.

Fig. III is a vertical section on the line 3—3 of Fig. II.

The pail A has a cover B with pulsator unit C on top of the cover, with which it has a tight joint D held by vacuum. From the pulsator unit a pipe E leads to the main vacuum pipe F. From the can cover there extend the two connections, namely, the milk tube G and the vacuum tube H connected with the teat-cup manifold $h$, with a plurality of pipes $h'$ leading to the teat-cups J. The milk tube or line G leads to the manifold $g$ with connections $g'$ to each of the teat-cups J.

This vacuum pulsator milking system involves the drawing of the milk by means of the connection G into the can A where a certain amount of froth and mist rise above the level of the liquid milk accumulating in the can or pail, and some impurities are liable to be carried through the valve connection D. The vapor or mist carried through the valve D may condense quickly and may form a sediment which may contain or might be helpful in propagating impurities immediately outside of the valve D, in view of which it is most desirable to prevent any return of such condensed vapors or any other impurities that in any way could settle in the neighborhood of the valve D.

On the other hand, the vacuum effected through the tube H may draw impurities from the manifold $h$, or if "inflation" of the teat-cup, that is the inner envelope in the usual form of vacuum teat-cups, should be punctured, some milk or milk vapor may be drawn through the tube H and through the ports in the unit pulsator and eventually through the main vacuum connection E. Any such impurities passing through the pulsator might leak back when work is stopped, or during the course of operation, and it is of great importance to prevent such sediment from reaching the milk in view of the common pipe connections incident to the use of the vacuum pulsator unit.

Thus while the milkway G normally carries the milk into the pail A, the spray and vapor rising by vacuum suction through the connection D may condense, and impurities carried by the vacuum line H through the pulsator also add to the chance of impurities collecting in the pulsator, so that a double danger exists against which there must be the greatest possible protection to assure purity of the milk in the pail and elimination of any sediment for germ accumulation or generation. It is thus of great importance to have positively preventive mechanism, but also to have mechanism providing for the maximum facility for cleaning and overhauling as well as for manufacture and assembly, proper functioning and durable.

In the unit pulsator C there is the vacuum pipe connection 1 with the port 2 connecting with the pulsator vacuum valve 3 and the teat-cup pulsation air-relief valve 4 with the nipple port 5 to connect with the vacuum manifold at the teat-cup cluster. The port 6 establishes vacuum connections with the milk pail, to cover B in which opening D is formed, by tubular nipple 7 having a collar 8 and a rubber gasket 9, the nipple being screwed into the lower end of the port 6.

A valve 10 having a conical end 11 rests on the top of the tube 7 to form a closure and maintain the vacuum in the pail, but permit suction effected through the vacuum pipe 1 to raise the valve 10 which automatically closes and thereby prevents any sediment due to condensation or otherwise in the port 6 from flowing back through the nipple 7, there being an annular space around the top of the nipple 7 forming a chamber between it and the inside of the port 6 to catch any such sediment or deposit.

At the junction of port 6 with port 2, a thimble 12 is screwed into the collar 13 axially above the port 6, but of slightly greater diameter. This thimble 12 has its lower end 14 engaging a seat forming a tight joint with the upper end of port 6, so that the thimble 12 forms a continuation of the port 6 with holes 15—15 located above the level of the port 2. A screw cap 16 forming the end of the thimble 12 serves to secure the thimble and permit ready removal, but at all times assures fastening in a way that will assure a firm and tight seat of the end at 14. This thimble 12 thus prevents any sediment or impurities sucked through the port 2 from entering the port 6, and the holes 15—15 provide for the suction of air from the milk pail. When vacuum connections with the main F are closed, any return condensations or any impurities that may flow back into the port 1 may therefore fill up the ports 2 and 1, but cannot flow over into the milk pail and cannot even reach the milk pail valve under any reasonable conditions of operation because they would have to accumulate above the level of the holes 15—15, and the port and tube connections are such that the arrangement as shown and described will most effectually trap any such condensations and impurities.

It will be seen in effect that the thimble 12 and the thimble 7 thus constitute a double trap or two cooperating traps, but also provide for the very simple removal of the upper trap thimble for cleaning purposes after operation of the pulsator, and the unscrewing of thimble 7, after removal of the pulsator from the milk pail cover B, assures accessibility for cleaning every part and surface of the mechanism.

The other parts and functioning of the pulsator, in cooperation with the portion hereinbefore specifically described, are as described and substantially as shown in my application Serial No. 437,542. The unit pulsator C is positioned on the milk pail cover B and with the vacuum connection effected the suction through the ports holds the connection D tight on the milk pail cover by the engagement of the collar 17 of the thimble 7 within the positioning recess 18 in the cover, while the gasket 9 forms a sealing joint under the vacuum pressure effected through the ports and by means of valve 10.

While the specific construction herein shown and described may be varied in many ways without departing from my invention, what I claim and desire to secure by Letters Patent is:

1. In a milking machine, a vacuum actuated pulsator, a common vacuum pipe connecting with a teat-cup pulsator port and valves and with a milk pail port and valve, a trap in the pulsator port connection and a separate trap in the milk pail valve connection.

2. A pulsator for milking machines comprising a unit mechanism including a pulsator port and a vacuum pipe adapted to be held to the cover by suction, a valve seat between the unit and the milk pail cover detachably secured to the unit, a trap associated with said valve, and a second trap disposed axially above said valve seat and preventing the inflow of accumulations from the pulsator port and the vacuum pipe to the milk pail valve.

3. In a pulsator for milking machines, a common vacuum exit port joining a vertical port leading to the milk pail and a second port leading to the pulsator valves, a valve at the junction with the milk pail cover and an annular space surrounding the same, and a trap at the junction of said ports above and separate from the milk pail valve.

In testimony whereof, I have signed my name to this application, in the presence of two subscribing witnesses, this 29 day of March 1922.

ERNEST C. OAKES.

Witnesses:
LOUIS H. JENNS,
B. B. McWHUNNEY.